United States Patent [19]

Glaser

[11] 4,345,750

[45] Aug. 24, 1982

[54] VISE

[76] Inventor: Hans F. Glaser, 6533 Greenridge Dr., Racine, Wis. 53406

[21] Appl. No.: 230,525

[22] Filed: Feb. 2, 1981

[51] Int. Cl.[3] .............................................. B23Q 3/02

[52] U.S. Cl. .................................... 269/136; 269/138

[58] Field of Search ............................... 269/134–138, 269/244, 246–248, 250–253

[56] References Cited

U.S. PATENT DOCUMENTS

| | | | |
|---|---|---|---|
| 1,125,207 | 1/1915 | Streeter et al. | 269/136 |
| 1,405,306 | 1/1922 | Martin | 269/138 |
| 2,667,799 | 2/1954 | Rzepela | 269/138 |
| 2,854,875 | 10/1954 | Patrick | 269/251 |
| 2,880,638 | 4/1959 | Muggli et al. . | |
| 3,232,602 | 1/1966 | Bernhard . | |
| 3,384,363 | 5/1968 | Wamuth et al. | 269/247 |
| 3,397,880 | 8/1968 | Kuban . | |
| 4,221,369 | 9/1980 | Takasugi | 269/138 |
| 4,223,879 | 9/1980 | Wolfe | 269/136 |
| 4,295,641 | 10/1981 | Boucher | 269/136 |

*Primary Examiner*—Robert C. Watson
*Attorney, Agent, or Firm*—Arthur J. Hansmann

[57] ABSTRACT

A vise having a base portion with two end abutments and a sliding block therebetween and a screw for moving the block into clamping relation with one of the abutments. The block and the base have a rail relationship for sliding of the block on the base, and the screw forces on the block to urge the block toward the sliding surface of the base. Also, a screw is disposed to one side of the block for holding it down on the base in the sliding relationship. The width of the block is less than the width of the abutments so that a clamp can be placed across the abutments but the block is free to move back and forth. Also, the block has a pin and a wedge which are forced upon by the screw for forcing the block downwardly on the base in the clamping action.

1 Claim, 12 Drawing Figures

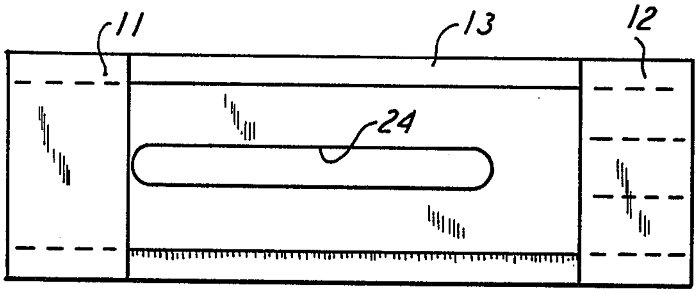
FIG. 4
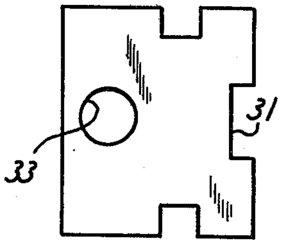
FIG. 5
FIG. 11
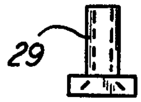
FIG. 12
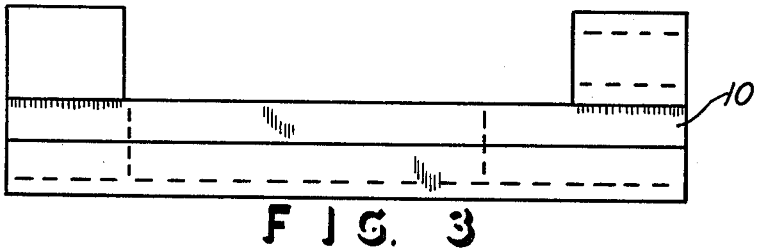
FIG. 3
FIG. 6
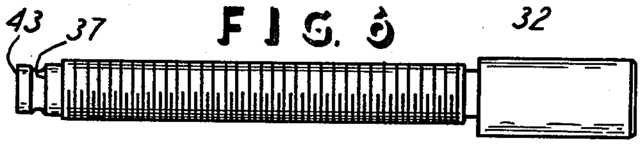
FIG. 7
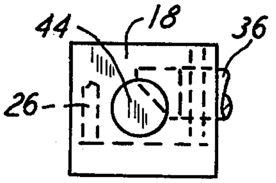
FIG. 8
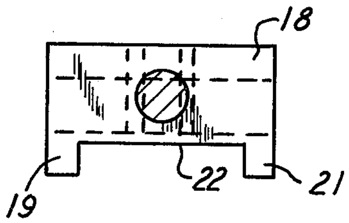
FIG. 9
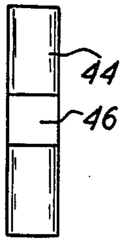
FIG. 10

VISE

This invention relates to a vise of the type which is used in clamping a work piece by means of a screw which forces the jaws of the vise towards each other.

BACKGROUND OF THE INVENTION

The prior art is already aware of various forms of vises for holding work pieces. These commonly consist of movable jaws which can clamp the work piece when one jaw is moved toward the other, such as by means of a screw or the like. Further, the prior art is aware of vises which have arrangements for urging the movable jaw into a position of exerting optimum force against the work piece, such that the jaw will not tip or tilt away from the work piece, for instance. However, in these prior art vises, the structures are complicated in that they require a number of moving parts for effecting the actions mentioned, and they still do not fully perform the function of providing a movable block or jaw which will not deviate from its path of movement when the jaw is forcing against a work piece, for instance. In those regards, U.S. Pat. Nos. 2,880,638 and 3,232,602 and 3,397,880 are examples of the prior art. However, the aforesaid disclosures differ from the present invention in the respects mentioned and in the respect that the present invention provides a movable jaw which is urged into stable contact with a base member when the jaw is clamping onto a work piece, and thus the work piece is securely and steadily held. In accomplishing this objective, a minimum of parts are employed and they all cooperate to serve the purpose of forcing the movable block or jaw against the work piece in a secure manner.

Another object of this invention, and a distinction over the arts cited, is that the movable jaw or block of this invention is of a narrower width than the width of the base piece upon which the jaw is supported, and thus the entire vise can be placed in a clamped position by another holding member and the movable jaw or block will still be free to move since it has the side clearance mentioned. This permits the vise of this invention to be placed in a holder or other clamp and to be retained in a specified or selected attitude or angle while the movable jaw can be moved toward and away from the work piece so that it can be employed for opening and closing and thereby holding various work pieces in succession while the entire vise is still in its set and clamped position.

The aforementioned features, and the differentiation with respect to the prior art mentioned, will be even more apparent upon reading the following description in light of the accompanying drawings.

BRIEF DESCRIPTION OF THE DRAWINGS

FIGS. 3, 4, and 5 respectively are a side view, a top view, and an end view of the base portion shown in FIGS. 1 and 2.

FIG. 6 is a side elevational view of the screw shown in FIG. 1.

FIG. 7 is a side elevational view of a wedge piece shown in FIG. 1.

FIG. 8 is a side elevational view of the movable block and parts related thereto, shown in FIG. 1 but in full view in FIG. 8.

FIG. 9 is an end elevational view of the block shown in FIG. 8.

FIG. 10 is a top plan view of a pin portion of the block of FIG. 8.

FIGS. 11 and 12 respectively are side elevational and bottom views of a spacer shown in FIG. 1.

DETAILED DESCRIPTION OF THE PREFERRED EMBODIMENT

Figure 2:
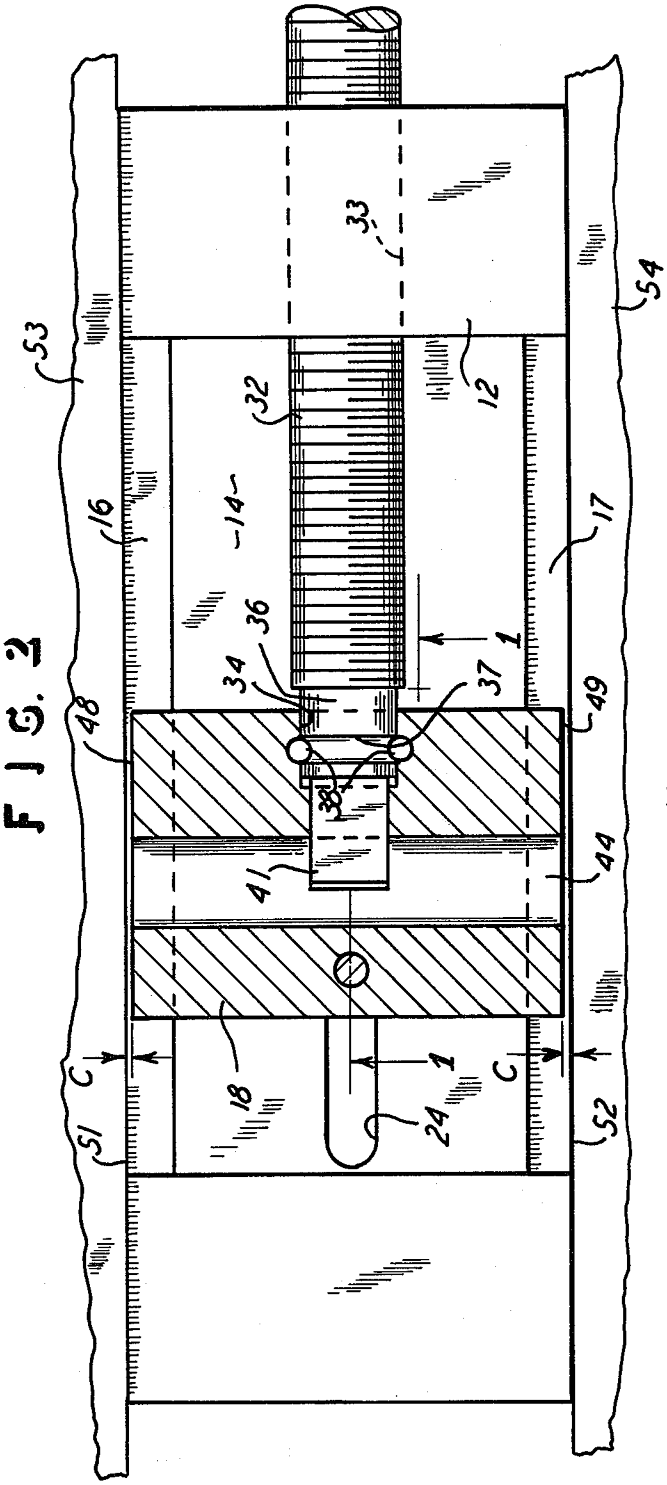
FIG. 2 is a top plan view of FIG. 1, and with a part thereof being sectioned according to the line 2—2 of FIG. 1.
Figure 1:
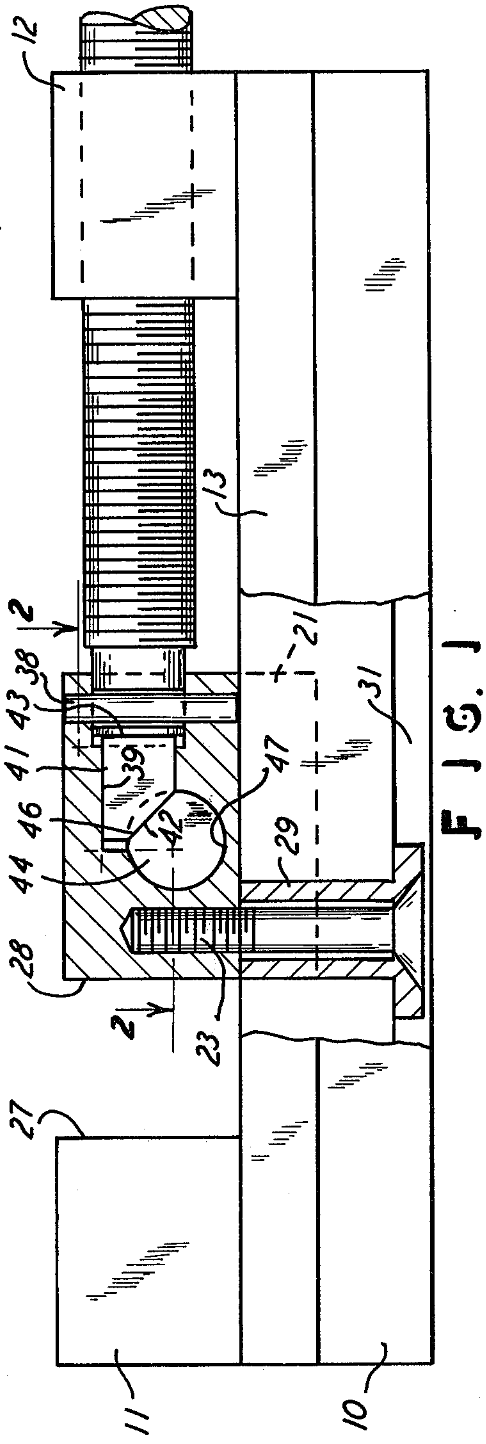
FIG. 1 is a side elevational view of the vise of this invention, and with a part thereof being sectioned according to the line 1—1 of FIG. 2.

The embodiment has a base portion 10 which is shown in the upright position in FIG. 1 and is thus U-shaped having the end abutments 11 and 12 and the interconnecting portion 13. The base 10 is of one piece and is elongate, as seen in FIG. 2, and it has an upright finished surface 14 and the side cutouts at 16 and 17. A movable block or jaw 18 is positioned on the surface 14 to slide left and right thereon, as viewed in FIGS. 1 and 2, and the block 18 is itself of an inverted U-shape in the end view, such as that seen in FIG. 9. The block 18 has depending portions 19 and 21 which mate and nest with the cutout 17 and 16 respectively, and thus the block 18 is closely guided in its sliding relationship on the base portion 10, so there is virtually no lateral movement of the block 18. Thus the block undersurface 22 mates with and slides on the base surface 14.

For holding the block 18 down onto the base 10, as mentioned, a bolt 23 extends through a slot 24 in the base 10 and the bolt 23 extends into the block 18, as shown in FIG. 1. Thus the block 18 has a screw hole 26 positioned offset on the block 18 and toward the fixed abutment 11 of the base 10. Thus the block 18 is securely held downwardly on the mating surfaces described in connection with the base 10. Therefore, when a work piece is clamped between the abutment 11 and the block 18, such as being in bearing contact with the respective surfaces 27 and 28, the bolt 23 prevents the block 18 from tilting away from the work piece under the clamping force. A cylindrical spacer 29 surrounds the shank of the bolt 23, as shown in FIG. 1, and thus the bolt 23 can be tightened to secure the block 18 downwardly on the base 10, as mentioned, but yet the block 18 will be sufficiently free to slide back and forth on the base member 10.

FIGS. 3, 4, and 5 show the aforementioned details of the base member 10, and FIGS. 8 and 9 further show the details of the block or jaw 18 with some parts shown related thereto. It will also be seen that the base portion 10 has a groove 31 in its bottom surface for receiving the head of the bolt 23 and the spacer 29 so that the sliding action of the block 18 will not be interfered with even though the bolt 23 is holding the block 18 in the downward position, as mentioned.

A screw 32 extends through a threaded opening 33 in the abutment 12, and thus the screw can be moved along its longitudinal axis for the desired sliding action of the movable block 18. The block 18 has a cylindrical opening 34 which rotatably receives the end 36 of the screw 32. The screw end 36 also has a circular groove 37 extending around the screw and mating with two cylindrical pins 38 for restraining of the relative movement between the screw 32 and the block 18. Thus the screw 32 can be rotated in the block 18 but it will of course impose the linear movement to the block 18, as desired.

The block 18 also has another opening 39 which receives a substantially cylindrical wedge piece 41 having a 45° wedge surface or angle 42, as seen in FIGS. 1 and 7. The screw 32 has its end 43 in abutment with the wedge piece 41, and the block opening 39 is sufficiently large to permit slight movement of the block in the left and right directions, as seen in FIG. 1. The wedge piece 41 is a part of the sliding block 18, and there is also a cylindrical pin 44 disposed in the block 18 and it too has a 45° angled surface 46 which is coincident with the surface 42 of the wedge 41. The pin 44 is shown in FIG. 10 with its angled surface 46.

It will now been seen and understood that when the screw 32 is rotated to move to the left, as seen in FIG. 1 and in FIG. 2, then the screw end 43 will bear against the adjacent end of the wedge 41 and thus urge the wedge 41 to the left and into mating contact with the block pin 44 as the angled surfaces 46 and 42 come into bearing relationship. By virtue of the 45° angle mentioned, optimum component of forces is achieved in moving the block both to the left and downward, as viewed in FIG. 1, and thus the block 18 is forced firmly and securely against the work piece in contact with the block surface 28. The block pin 44 is free to rotate in the cyindrical opening 47 extending through the block 18 for snugly receiving and accommodating the pin 44, as shown. That is, the rotation mentioned will be adequate to have the angled surfaces 42 and 46 fully mate with each other in a matching or planar relationship to effect the transfer of force from the wedge piece 41 and onto the pin 44, as desired. Of course the screw 32 has sufficient clearance or play in its longitudinal movement relative to the block 18 as it relates with the pin 38, all so that the full force will be transmitted only through the angle surfaces 42 and 46. FIGS. 6 through 10 all show the aforementioned detail.

A significant feature is the provision of the block 18 being narrower than the so-called width or corresponding dimension across the base piece 10, as shown in FIG. 2. Thus the block 18 is provided with a clearance designated "C" in FIG. 2 and at each opposite side of the block 18. Thus the side walls 48 and 49 of the block 18 are spaced apart a dimension less than the spacing apart of the corresponding side walls 51 and 52 of the base piece 10, all as seen in FIG. 2. Those dimensions and the relationship mentioned with respect to the clearance "C" is in the direction transverse to the direction of sliding movement of the block 18 and that of course is transverse to the center line or plane of the base 10 and that is also the longitudinal direction or center line or plane of the screw 32. With that arrangement of the clearance, another and larger clamp with its jaws 53 and 54 can be applied to the vise of this invention to hold the vise in any set orientation on a machine or the like, but the movable block or jaw 18 will still be free to move under the action of the screw 32. This is true since the clamp jaws 53 and 54 are planar, as shown, and therefore are also clear of the narrower block 18 which is thus free to move, as mentioned. This permits the vise of this invention to be placed into a machine and held in one set orientation while a series of work pieces can be moved into and out of the vise as the jaw 18 is moved back and forth for the clamping and releasing of those work pieces.

The screw 32 is shown to be substantially on the center line between the abutments 11 and 12, and the base interconnecting portion 13 is offset to one side of that center line. The entire base 10 is of one piece with the abutments 11 and 12 and the interconnecting portion 13, and it is thus reliable and solid and can be utilized as mentioned. Further, the relationship between the base 10 and the block 18 is such that the matched surfaces present a rail relationship with the three-sided mated sliding surfaces heretofore described. It will also be noticed that the screw 32 and thus the wedge 41 and the matched angled surfaces 42 and 46 are all offset on the block 18 to be toward the upper portion of the block 18, as viewed in FIG. 1. That is, the force on the block 18 through the angled matched surfaces 42 and 46 will urge the block 18 downwardly and prevent it from tipping against the reaction force of the work piece being clamped. Further, the bolt 23 is offset with respect to the center of the block 18, and that offset is to the side again where the block would normally tend to tip up and away from the base 10. Therefore, there is a combination of the two forces acting on the block 18, namely that imposed at the angled surfaces 42 and 46 and that imposed through the bolt 23, both forces being arranged to hold the block 18 downwardly at its surface 28 and thus create a steady and secure holding of the work piece.

The actual dimension for the clearance "C" is 0.002 inches, and that is sufficient to allow the aforementioned movement of the block 18 under conditions where the vise is clamped by the jaws 53 and 54, as mentioned, and yet chips of metal from the work piece will not fall adjacent the block surfaces 48 and 49 to impede the movement of the block, since the clearance is too close to permit the chips to do that. In this manner, the vise in this invention becomes a universal fixture since it can be retained in the larger clamp with the jaws 53 and 54. This arrangement provides for a constant or instant fixture where only the jaw 18 is moved back and forth for opening and closing but the entire remainder of the clamping structures shown in FIG. 2 remain in position and thus in the desired constant set position.

Also, with the arrangement of the block 18 and the parts described on the interior thereof, including the screw end 36, the device has its entire length between the abutments 11 and 12 as the operative and effective length of the vise since there are no unnecessary intervening parts nor extensions or connections for a moving jaw in order to achieve the aforementioned features. This gives a greater work length between the ends of the vise of this invention and there is no additional yoke or like parts required, as there is in the prior art to assure that the movable jaw will remain down on its base.

The pin 44 extends for the full width of the block 18, and the pin 44 thus forces across the entire block width to achieve optimum hold-down of the block 18. Also, the pin 44 is self-adjusting in the cylindrical opening 47 in block 18, so there is the self-adjusting forcing of the pin 44 on the block 18 since the flat 46 acts as a fulcrum surface and since the parts 44 and 41 are independent of each other without being connected together. The two end portions of the pin 44 force onto the block 18 for firm holding.

The height of the block 18, as viewed in FIG. 1, is also less than the respective heights of the abutments 11 and 12, and thus there is clearance between a plane across the upper surfaces of the abutments 11 and 12 and the upper surface of the block 18, just as there is clearance "C" to the sides of the block 18 as shown in FIG. 2. With that arrangement, the block 18 can be clamped by jaws 53 and 54 either across the sides of the vise, as shown in FIG. 2, or across the top of the vise, as now being explained in connection with FIG. 1, and, in either event, the block 18 will have clearance for moving while the vise 10 is clamped. Thus, the projected area of the ends of the block 18 which face the respective abutments 11 and 12 is less than the corresponding projected area of the abutments 11 and 12, all for the clearance relative to the sides and tops of the abutments 11 and 12, as mentioned. That is, the block 18 is narrower than and does not extend to the elevation of the opposite ends of the base 10.

What is claimed is:

1. A vise comprising a base of an upright U-shape with two spaced apart abutments and an interconnecting portion extending between and offset with respect to the center line between said abutments, a block slidable on said interconnecting portion and along said center line and having a clamp surface facing one of said abutments for clamping a work piece with said one abutment a cylindrical pin in said block and extending in said transverse direction and having a flat angled surface thereon faced away from said interconnecting portion, a wedge on said block and in contact with said screw and said pin and having a surface mated with said flat angled surface, said mated surfaces being disposed at an elevation lower than the center line of contact of said screw and said wedge for urging said block downwardly onto said interconnecting portion, a screw threadedly mounted in the other of said abutments and in abutment with said wedge in said block for forcing said block toward said one abutment in the clamping action, said block and said interconnecting portion having a three-sided mated rail relationship therebetween for the sliding of said block on said interconnecting portion and the avoidance of movement of said block transverse to said center line, said interconnecting portion having a slot extending therein parallel to and on the plane of said center line, a connector attached to said block and extending through said slot and in sliding relation with said interconnecting portion for guiding said block on said interconnecting portion, said connector being offset on said block to the side thereof intermediate said one abutment and said mated surfaces, the projected area of said block on the plane in the direction transverse to said center line being less than the corresponding projected area of each of said abutments and thereby said block having clearance with the planes extending parallel to said center line and between the respective edges of said abutments for clamping of said vise across said abutments while having clearance for the sliding movement of said block.

* * * * *